United States Patent [19]

Titus

[11] 4,234,629
[45] Nov. 18, 1980

[54] METHOD FOR IMPROVING THE REMOVAL OF OIL FROM SURFACES

[75] Inventor: Paul E. Titus, Houston, Tex.

[73] Assignee: Shell Oil Company, Houston, Tex.

[21] Appl. No.: 26,627

[22] Filed: Apr. 2, 1979

Related U.S. Application Data

[62] Division of Ser. No. 796,271, May 12, 1977, Pat. No. 4,160,063, which is a division of Ser. No. 614,093, Sep. 17, 1975, Pat. No. 4,039,717, which is a division of Ser. No. 416,712, Nov. 16, 1973, now Re. 28,257.

[51] Int. Cl.³ ............................................. B05D 3/02
[52] U.S. Cl. ................................................. 427/388.2
[58] Field of Search ............... 427/236, 239, 302, 327, 427/339, 340, 421, 426, 388.2

[56] References Cited

U.S. PATENT DOCUMENTS

| | | | |
|---|---|---|---|
| 3,647,507 | 3/1972 | Ashcraft | 427/302 X |
| 4,039,717 | 8/1977 | Titus | 427/239 |
| 4,160,063 | 7/1979 | Titus | 427/388 A |

*Primary Examiner*—Bernard D. Pianalto

[57] ABSTRACT

A method for facilitating the removal or preventing the adherence of residual oil in oil tankers and other vessels or containers, on the surfaces of oil spill cleanup equipment such as skimmers and booms, and on sucker rods or other surfaces in oil wells, by coating surfaces contacting the oil with a film of a polymer that prevents or reduces oil adherence. Materials effective in reducing oil adherence are oleophobic films formed by complexing a polyacrylamide or carboxymethylcellulose with salts of polyvalent metals such as aluminum, chromium and iron.

34 Claims, No Drawings

METHOD FOR IMPROVING THE REMOVAL OF OIL FROM SURFACES

This is a division, of application Ser. No. 796,271, filed May 12, 1977, U.S. Pat. No. 4,160,063 which is a division of application Ser. No. 614,093 filed Sept. 17, 1975, U.S. Pat. No. 4,039,717 which in turn is a division of application Ser. No. 416,712 filed Nov. 16, 1973, U.S. Pat. No. Re. 28,257.

BACKGROUND OF THE INVENTION

It frequently is desirable to make the surfaces of various tanks, vessels, or other equipment resistant to the adherence of various oily materials, particularly crude oil. One example is tanks and vessles that are used to contain or transport crude oil or refined products, particularly where contamination of the subsequent contents is a problem. Thus, the removal of substantially all of the oil upon draining of a tanker or other vessel or container poses several attractive advantages. First, there is the advantage of avoiding wasted oil. Approximately 0.3% of the cargo of oil tankers is presently lost because it cannot be removed economically. A second advantage is that material is not left behind in the vessel which will contaminate subsequent cargoes. Such contamination can lead to great expenses in purifying subsequent cargoes. A third and principle advantage is the avoidance of pollution of the ocean. As is frequently the practice today, residual oil washed out of the tanker with salt water is discharged into the open sea with ecologically disastrous results. Accordingly, if the surfaces of such tankers or vessels could be treated to minimize the adherence of oil to the walls thereof and to facilitate cleaning or washing thereof, such would be greatly beneficial.

A further example of equipment which is desirably resistant to the adherence of oil is oil spill cleanup equipment such as skimmers and booms. Such equipment is used periodically on oil-coated waters and, accordingly, must be cleaned as frequently. Further, the adherence of heavy oil, such as Bunker C, on various critical surfaces of these equipments can cause the equipment to malfunction. Thus, not only would treatment of the surfaces of this equipment reduce maintenance thereof but it would also ensure its efficient operation.

Yet another example of equipment which would desirably have surfaces resistant to the adherence of oil is that associated with oil wells. In some oil wells the crude is so viscous that production is limited by the speed of sucker rod descent during each stroke. Further, the oil tends to foul much of the production equipment that it contacts, resulting in added effort for recovery. Accordingly, if the various contacting surfaces could be rendered resistant to adherence by oil, production efficiency would be increased markedly.

The present invention in response to these needs of the art overcomes the above described difficulties and provides successful solutions to the problems of the art, as will be apparent from the following description thereof.

SUMMARY OF THE INVENTION

The primary purpose of this invention resides in providing a method for treating the surfaces of equipment which comes into contact with various oily materials so that such surfaces will resist the adherence of various oily materials and thereby may more easily be cleaned of such materials.

The above purpose has been achieved through the utilization of oleophobic films for coating such surfaces which are polyacrylamide and carboxymethylcellulose complexed or cross-linked with salts of polyvalent metals such as aluminum, chromium and iron.

The method of this invention broadly extends to the removal of residual oil from contacting surfaces by coating the surfaces with a film of a polyacrylamide cross-linked in the presence of water with a salt of a polyvalent metal. The method further extends to the removal of residual oil from contacting surfaces by coating the surfaces with a film of carboxymethylcellulose cross-linked in the presence of water with a salt of a polyvalent metal.

Within the framework of the above described methods, the present invention not only solves the above mentioned problems of the prior art, but also achieves further significant advantages as will be apparent from the description of preferred embodiments following.

DESCRIPTION OF PREFERRED EMBODIMENTS

The present invention is drawn to a method for reducing the adherence of oily materials to surfaces by the application of a coating thereto that is itself resistant to the adherence of oil, i.e. oleophobic. The coating is a water-soluble polymer that has been cross-linked or complexed with a suitable material. Once cross-linked or complexed, the polymeric material is viscid, tenacious, and essentially insoluble in water. In this form as a coating, it adheres readily to properly prepared surfaces of metal, wood, or plastic and is not readily removed either by dissolution, washing, or attrition due to contact by various materials.

The present ivnention particularly applies to the transportation of petroleum products in vessels and barges. It is, however, broadly pertinent to removing oil or preventing the adherence of oil to various contacting surfaces such as in conduits or storage tanks. Even further, it finds broad usage, as above noted, in preventing the adherence or facilitating the removal of oil from oil spill cleanup equipment such as skimmers and booms, and is well suited to use on oil well equipment, particularly when the crude is so viscous that production is limited by the speed of sucker rod descent during each stroke. Thus, wherever there is a problem with oil which adheres to a contacting surface, the present invention can be utilized to alleviate this problem by coating the contacting surface with the compounds envisioned by the present invention and thereby reducing the adherence of oil to such contacting surfaces and facilitating the cleaning thereof.

While the present invention is particularly pertinent to petroleum products, it is equally applicable to similar products which adhere to contacting surfaces and which adherence can be avoided or reduced by the use of the present invention. Thus, the invention pertains to a wide variety of products which exhibit such adherence characteristics, for example oils and fats of animal and/or vegetable origin.

Polymeric coatings useful in the present invention exhibit a strong adherence to metals and have substantial internal strength. It is important that such polymeric coatings have strong adherence and strength inasmuch as it is desirable that the coating be used over and over again in whatever particular application it is employed.

To produce a polymeric coating of this strength, a cross-linking or complexing step is employed after the polymer has been dissolved in water so that the coating material is largely made up of water enclosed or entrapped within a network of membranes. While the membranes are permeable to water, the transfer is only accomplished at a slow rate, e.g. about 0.01 lb/ft$^2$ surface/hr. at 75° F. and 55% RH. These water permeable membranes within which water is entrapped are always somewhat wet, and as such are very oleophobic and shed oil or similar sticky materials readily. While various polymeric materials are known to have this property, most such materials are inadequate for one or more reasons, e.g. the polymeric materials may either lack the quality of strong adherence or internal strength. In accordance with the invention, however, two very successful polymeric materials have been discovered for forming such oleophobic films—complexed polyacrylamide and complexed carboxymethylcellulose. These materials when dissolved in fresh or sea water are cross-linked with salts of polyvalent metals such as aluminum, chromium and iron. Typical salts include basic aluminum acetate, ferric chloride, ferrous chloride, chromic potassium sulfate, aluminum sulfate, aluminum nitrate, chromic acetate, aluminum potassium sulfate, aluminum ammonium sulfate. The speed of cross-linking varies markedly from less than a minute up to several hours depending on the type of metal available.

Polyacrylamide under the trade name Reten A0-1 from Hercules has been found to work very suitably with the present invention. Carboxymethylcellulose under the trade name CMC from Hercules, Incorporated also performs well with the present invention.

Polymer concentrations of about 0.25 to about 2.0% by weight in both fresh water and sea water are found to be highly suitable. Cross-linking agent solutions of from about 1 to about 5% by weight, basis water, have been used in a manner such that the resultant mixture, polymer plus cross-linking agent, is satisfactory for use. Depending upon the nature and size of the apparatus to be covered, the concentrations of these solutions can be further optimized as desired.

The coating of the present invention may be applied in several different ways. In one case, where a large surface if to be covered, the polymer solution can be applied first, followed by an application of the complexing solution. In another case, the polymer solution and the complexing solution can be mixed simultaneously as they are being applied. In still another case, particularly where relatively small surfaces have to be covered, the polymer and complexing solutions can be mixed prior to application. Application of the coating materials to surfaces can be made by various conventional means such as spraying or painting. appropriately located nozzles may be employed which will coat the metal or other surface as the oil or other material is brought into contact therewith. The same nozzles can also be used to remove the oil or other material during the emptying or draining process. In addition, the polymer film may be put on the contacting surface by dipping, brushing or other means suitable for achieving full contact between the contacting surface and the film. Where the vessel or barge has ribs inside its tank or other structural obstructions, the polymer may be applied as a foam so that it gets underneath the ribs or other obstructions by applying the foam to the top of the oil as the oil fills the container. The foam floats on the oil and touches the underside of ribs or other obstructions as it passes upwardly in the tank. Such polymer may be foamed in any conventional manner and may be foamed during or after addition of the complexing material.

If the polymer coating is allowed to dry, it will remain affixed to the coated surface. the film will regain its ability to resist oil if it is flushed with water prior to use. Where it is desired to retain the coating as a wet material, humectants such as glycerine or ethylene glycol may be added thereto to retard the drying out of the complexed polymer film when in contact with air for extended periods of time. Other low molecular weight polyalcohols function well as humectants. The introduction of oil to the polymer solution as a dispersion prior to complexing also serves to reduce drying of the coating when in contact with air.

The complexed material can be modified to suit specific circumstances. Thus, the complexed polymer can be extended and the density and rheology altered by the addition of solid, liquid or gaseous inert ingredients such as finely divided clay, oil or air. The solid inert material should be added to the polymer solution prior to complexing. The liquid inert material should be emulsified in the polymer solution prior to complexing. The gas should be injected into the polymer solution before complexing.

Use of inert solids to extend the polymeric coating can (1) decrease the amount of polymer necessary for coating and thus reduce cost, (2) decrease the fluidity of the polymeric coating and thus reduce the tendency to flow prior to and after complexing, and (3) reduce the tendency of the polymer solution to splash when applied before complexing. Use of inert liquids (oils) to extend the polymeric coating can (1) decrease the amount of polymer necessary for coating and thus reduce cost, (2) decrease the fluidity of the polymeric coating and thus reduce tendency to flow prior to and after complexing, (3) reduce the tendency of the polymer solution to splash when applied before complexing, (4) reduce the density of the polymeric coating and (5) reduce the tendency of the aqueous coating to dry out when subjected to a dry atmosphere.

The polymeric coating extended with finely divided gas bubbles has the qualities listed for the coating extended with the liquid inerts with the exception that gas does not retard film drying.

Small amounts of surfactant may be added to the polymer solution to improve the coverage of various surfaces; alkyl phenoxyl polyethoxyethanols are favored surfactants; a Rohm and Hass product manufactured under the trade name "Triton X-100" is preferred. The addition of the surfactant to the film facilitates removal of the oil after emptying of the contents of the vessel or other container. A wide range of surfactants is broadly suitable, for example, up to about 500 parts per million based on the complexed polymer. A preferred range is from about 2 to about 500 parts per million. It is also preferred that the surfactant be combined with the polymer for joint application rather than being applied separately. In general, the only qualification absolutely required of the surfactant is that it be compatible with the complexed polymer. The polymeric material of the present invention may also contain other additives for such purposes as preventing bacterial decay and/or metal corrosion, provided such is necessary. An example of such additives include formaldehyde as a bactericide and sodium chromate as a corrosion inhibitor.

The following examples are presented to further exemplify the invention but are not intended to be limiting thereof.

EXAMPLE I

Three test solutions were made and labeled as follows:

Solution A=1%w Reten A-01 (polyacrylamide from Hercules, Incorporated) dissolved in a 10%w sodium chloride solution.

Solution B=1%w hydrated aluminum nitrate, Al(NO$_3$)$_3$.9H$_2$O in water.

Solution C=1%w chromic potassium sulfate, Cr$_2$(SO$_4$)$_3$.K$_2$SO$_4$.24H$_2$O in water.

Four steel test panels (4"×8"×⅛") were cleaned and coated as follows:

Panel 1 was coated by painting on a layer of Solution A followed by painting on a layer of Solution B.

Panel 2 was coated by painting on a layer of Solution A followed by painting on a layer of Solution C.

Panel 3 was coated by painting on a layer of material consisting of a mixture of 20 parts of Solution C and 100 parts of Solution A.

Panel 4 was not covered by any coating and was used as a control.

After allowing the coated panels to cure for 20 minutes, they were immersed in No. 6 fuel oil. After 18 hours in the oil, the panels were removed and rinsed in a stream of tap water. The oil was readily removed from panels 1, 2 and 3, whereas panel 4 was covered by a thick layer of oil essentially unaffected by the water wash.

EXAMPLE II

Four test solutions were made and labeled as follows:

Solution A=0.5% carboxymethylcellulose (CMC type 7H3S, Hercules Incorporated) in tap water.

Solution B=0.25%w CMC in tap water.

Solution C=0.5%w CMC in synthetic sea water.

Solution D=0.25%w CMC in synthetic sea water.

Four steel panels (4"×8"×⅛") were cleaned and each was coated by painting on a layer of one of the test solutions. Each test panel was then painted with a layer of a 1%w aqueous solution of aluminum nitrate.

The four coated panels were immersed in No. 6 fuel oil. After 20 hours in the oil, the panels were removed and allowed to drain for about 30 minutes. At this time, they were immersed in clean tap water. The remaining No. 6 fuel oil adhering to the panels came off readily and floated on the surface of the wash water leaving the test panels oil-free.

I claim as my invention:

1. A method for facilitating the removal of residual oil from contacting surfaces comprising coating the surfaces with a film of polyacrylamide cross-linked in the presence of water with a salt of a polyvalent metal, contacting the surfaces with oil, and removing the oil from the surfaces.

2. The method of claim 1 wherein the polyvalent metal is selected from the group consisting of aluminum, chromium and iron.

3. The method of claim 1 wherein the surfaces are the interior of a vessel utilized to transport crude oil.

4. The method of claim 3 wherein the polymer is foamed to reduce its density and allow it to float upon the oil which fills the vessel, thereby contacting the underside of obstructions within the interior of the vessel.

5. The method of claim 1 wherein the contacting surfaces are oil spill cleanup equipment and the coating also functions to minimize the adherence of oil to the surfaces.

6. The method of claim 1 wherein dispersed oil is added to the polymer to retard drying out of the polymer when in contact with air.

7. The process of claim 1 wherein the polymer is extended by the addition of a finely divided inert material thereto.

8. The process of claim 1 wherein the polymer is extended by the addition of a clay thereto.

9. The process of claim 1 wherein the polymer is extended by the addition of a liquid thereto.

10. The process of claim 1 wherein the polymer is extended by the addition of an oil thereto.

11. The process of claim 1 wherein the polymer is extended by the addition of a gas thereto.

12. The process of claim 1 wherein the polymer is extended by the addition of air thereto.

13. The method of claim 1 wherein formaldehyde is added to the polymer to prevent bacterial decay.

14. The method of claim 1 wherein a chromate is added to the polymer to reduce corrosion.

15. The method of claim 1 wherein glycerine is added to the polymer to retard drying out of the polymer when in contact with air.

16. The method of claim 1 wherein a polyalcohol is added to the polymer to retard drying out of the polymer wherein contact with air.

17. The method of claim 1 wherein ethylene glycol is added to the polymer to retard drying out of the polymer when in contact with air.

18. A method for facilitating the removal of residual oil from contacting surfaces comprising coating the surfaces with a film of carboxymethylcellulose cross-linked in the presence of water with a salt of a polyvalent metal, contacting the surfaces with oil, and removing the oil from the surfaces.

19. The method of claim 18 wherein dispersed oil is added to the polymer to retard drying out of the polymer film when in contact with air.

20. The method of claim 18 wherein the polyvalent metal is selected from the group consisting of aluminum, chromium and iron.

21. The method of claim 18 wherein the surfaces are the interior of a vessel utilized to transport crude oil.

22. The method of claim 21 wherein the polymer is foamed to reduce its density and allow it to float upon the oil which fills the vessel, thereby contacting the underside of obstructions within the interior of the vessel.

23. The method of claim 18 wherein the contacting surfaces are oil spill cleanup equipment and the coating also functions to minimize the adherence of oil to the surfaces.

24. The method of claim 18 wherein ethylene glycol is added to polymer to retard drying out of the polymer film when in contact with air.

25. The process of claim 18 wherein the polymer is extended by the addition of a finely divided inert material thereto.

26. The process of claim 18 wherein the polymer is extended by the addition of clay thereto.

27. The process of claim 18 wherein the polymer is extended by the addition of a liquid thereto.

28. The process of claim 18 wherein the polymer is extended by the addition of an oil thereto.

29. The process of claim 18 wherein the polymer is extended by the addition of a gas thereto.

30. The process of claim 18 wherein the polymer is extended by the addition of air thereto.

31. The method of claim 18 wherein formaldehyde is added to the polymer to prevent bacterial decay.

32. The method of claim 18 wherein a chromate is added to the polymer to reduce corrosion.

33. The method of claim 18 wherein glycerine is added to the polymer to retard drying out of the polymer film when in contact with air.

34. The method of claim 18 wherein polyalcohol is added to the polymer to retard drying out of the polymer film when in contact with air.

* * * * *